(12) United States Patent
Schulz

(10) Patent No.: US 12,445,014 B2
(45) Date of Patent: Oct. 14, 2025

(54) ELECTRIC MACHINE WITH OPEN COIL WINDING FOR DIRECT COOLING

(71) Applicant: Rolls-Royce Deutschland Ltd & Co KG, Blankenfelde-Mahlow (DE)

(72) Inventor: Florian Schulz, Munich (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 207 days.

(21) Appl. No.: 18/369,147

(22) Filed: Sep. 16, 2023

(65) Prior Publication Data
US 2024/0097530 A1 Mar. 21, 2024

(30) Foreign Application Priority Data
Sep. 16, 2022 (DE) ...................... 10 2022 209 762.9

(51) Int. Cl.
| | |
|---|---|
| H02K 9/00 | (2006.01) |
| B64D 27/24 | (2024.01) |
| H02K 3/32 | (2006.01) |
| H02K 5/10 | (2006.01) |
| H02K 5/20 | (2006.01) |
| H02K 15/06 | (2025.01) |

(52) U.S. Cl.
CPC ............... *H02K 9/00* (2013.01); *B64D 27/24* (2013.01); *H02K 3/32* (2013.01); *H02K 5/10* (2013.01); *H02K 5/20* (2013.01); *H02K 15/06* (2013.01)

(58) Field of Classification Search
CPC .. H02K 9/00; H02K 3/32; H02K 5/10; H02K 5/20; H02K 15/06; H02K 3/24; H02K 3/30; H02K 3/44; H02K 5/225; H02K 9/02; H02K 11/33; B64D 27/24
See application file for complete search history.

(56) References Cited

U.S. PATENT DOCUMENTS

| | | | | |
|---|---|---|---|---|
| 7,390,757 | B2 * | 6/2008 | Woo | H01L 21/76837 438/786 |
| 2013/0064697 | A1 * | 3/2013 | Fukasaku | H02K 3/44 417/410.1 |
| 2018/0323673 | A1 | 11/2018 | Shiraki et al. | |
| 2019/0103780 | A1 | 4/2019 | Daboussi et al. | |
| 2022/0069670 | A1 * | 3/2022 | Freely | H02K 3/22 |

FOREIGN PATENT DOCUMENTS

| | | |
|---|---|---|
| DE | 3536538 A1 | 4/1987 |
| DE | 102009060959 A1 | 7/2011 |
| DE | 102019116264 A1 | 12/2020 |
| WO | WO-2007097189 A1 * | 8/2007 ............... H02K 3/12 |

OTHER PUBLICATIONS

WO-2007097189-A1_translate (Year: 2007).*
German Office Action for German Patent Application No. 10 2022 209 762.9, dated Aug. 28, 2023, pp. 1-12.

* cited by examiner

*Primary Examiner* — Tulsidas C Patel
*Assistant Examiner* — Mohammed Ahmed Qureshi
(74) *Attorney, Agent, or Firm* — Lempia Summerfield Katz LLC

(57) ABSTRACT

An electric machine includes a flow path for coolant fluid, a housing sealed off in relation to the flow path, a power supply unit, and at least one coil. The at least one coil includes at least one insulated section and contacts, wherein the contacts of the at least one coil are electrically connected inside the housing to contacts of the power supply unit and the at least one insulated section is arranged in the flow path.

20 Claims, 5 Drawing Sheets

ELECTRIC MACHINE WITH OPEN COIL WINDING FOR DIRECT COOLING

The present patent document claims the benefit of German Patent Application No. 10 2022 209 762.9, filed Sep. 16, 2022, which is hereby incorporated by reference in its entirety.

TECHNICAL FIELD

The present disclosure relates to an electric machine, to an aircraft, and to a method for producing an electric machine.

BACKGROUND

Aircraft drive arrangements take a variety of forms. Internal combustion engines, (e.g., piston engines or gas turbine engines), allow long ranges and high speeds. Drives having one or more electric motor(s) allow the use of sustainably generated energy and are in some cases particularly low-maintenance and quiet.

High drive powers are sometimes required in the aviation sector in particular, wherein the smallest possible engines are desired at the same time. A low overall weight may be desired at the same time. More recent electric motors for the aviation sector are being developed more and more frequently on the basis of a system using 800 V, which is accompanied by further challenges for the design of electric motors.

SUMMARY AND DESCRIPTION

The object of the present disclosure is to enable the highest-performance electric machine possible.

The scope of the present disclosure is defined solely by the appended claims and is not affected to any degree by the statements within this summary. The present embodiments may obviate one or more of the drawbacks or limitations in the related art.

According to one aspect, an electric machine is provided, for example, for a vehicle, (e.g., an aircraft). The electric machine includes a flow path for coolant fluid, a housing sealed off in relation to the flow path, a power supply unit, and at least one coil, which includes at least one insulated section and contacts. The contacts of the at least one coil are electrically connected inside the housing to contacts of the power supply unit and the at least one insulated section is arranged in the flow path.

In this way, direct cooling of the one or more coils using coolant fluid becomes possible, wherein, due to the insulation and the electrical connection in the housing sealed off in relation to the flow path, an electrically conductive coolant fluid or a coolant fluid that contains electrically conductive components may also be used. The at least one coil may therefore be cooled particularly effectively, because the coolant fluid may cool the at least one coil directly and, for example, no interconnected heat sink or the like is required. Furthermore, an external flow of the coolant fluid, (e.g., wind, travel wind, or comparable phenomena in water), may be used, wherein the heated coolant fluid may be conducted out of the machine. Additional re-cooling, as may be in the case of circulating cooling systems, may thus be omitted. For example, the coolant flow may additionally be strengthened by a compressor. A particularly high performance of the electric machine is possible due to the particularly effective cooling.

The electric machine may include a stator. The at least one coil may be designed as a stator coil of the stator. For example, the at least one coil is fastened on a base of the stator of the electric machine. This permits a particularly high-performance electric machine.

Optionally, the at least one coil is fastened by a mount, which holds the at least one coil in the flow path, on the base of the stator. Coolant fluid may thus be applied particularly well to the at least one coil.

The electric machine may furthermore include a rotor rotatably mounted in relation to the stator. The rotor drives, for example, a propeller in order to generate thrust.

In particular, the electric machine may be configured in the form of a transverse flux machine. This enables a particularly flat construction and large torques. The at least one coil is wound, for example, around an axis of rotation of the rotor. Particularly effective guiding of the coolant fluid around the coil is possible in this case. Alternatively, it is a radial flux machine or an axial flux machine.

The flow path optionally has a fluid connection to an external environment. The coolant fluid may be air from the external environment. Due to the above-described design of the electric machine, the at least one coil may be cooled directly using the outside air, even if it contains raindrops, for example. Alternatively, liquid cooling may be provided, in particular with water as the coolant fluid.

The flow path may begin at the external environment (for example, at an air inlet) and end at the external environment (for example at an air outlet). In this manner, a particularly simple supply with and discharge of coolant fluid is possible.

The flow path may extend through the at least one coil. For example, the flow path extends between and/or through turns of the at least one coil. Particularly good cooling is thus possible.

At the insulated section, an electrical conductor of the coil is completely enclosed by an insulation layer. The insulation layer may be separate for adjacent coil turns. The insulation layer may have a uniform thickness along the length of the conductor and around the conductor. In contrast to embedding the entire coil, through flow and therefore significantly better heat transfer to the coolant fluid is thus possible. The insulation layer may enclose the entire surface of the coil in the flow path.

The insulation layer at the insulated section may have a minimum thickness of 50 micrometers ($\mu$m), 90 $\mu$m, 140 $\mu$m, or 180 $\mu$m. This enables, depending on the dimension of the applied voltage, secure insulation even if conductive particles from the external environment enter the flow path. For example, at a voltage of 800 V, a thickness of 180 $\mu$m may be used.

The insulation layer may include a fluorinated material. Such materials enable particularly good dielectric properties and moreover a particularly good resistance to high temperatures, water, chemicals, and electric arcs and additionally also enable good mechanical flexibility. The material of the insulation layer may be FEP (tetrafluoroethylene-hexafluoropropylene copolymer), PTFE (polytetrafluoroethylene), ETFE (ethylene tetrafluoroethylene copolymer), or PFA (perfluoroalkoxy polymer). Alternatively, or additionally, a silicone material may be used.

The insulation layer may be provided with an outer layer, in particular coating. The electrically insulating insulation layer may be enclosed by an electrically conductive layer. This permits uniform conditions with respect to electric fields, independently of water or dirt on the coil. To achieve a comparable effect using the insulation layer alone, a significantly greater thickness would have to be provided.

Specifically, an electrically conductive outer layer, with which the insulation layer is provided, is configured in the form of a metal coating. This is producible well and precisely.

The power supply unit may provide a voltage of several hundred volts, (e.g., 400 V or more or 800 V or more), at the contacts of the at least one coil. This permits the generation of a strong magnetic rotational field which, via the rotor, drives a propeller that converts it into a powerful thrust.

The at least one coil may be guided by a seal through a wall of the housing to the voltage source. The seal, together with the insulation layer, seals off the housing in relation to the coolant fluid, in particular in a watertight and/or airtight manner.

According to one aspect, an aircraft is provided, wherein the aircraft includes a rotor unit having rotor blades, and further includes an electric machine according to any embodiment described herein to drive the rotor unit. The rotor unit and the electric machine form a drive system for the aircraft. The drive system is used to generate thrust and/or lift for the aircraft.

According to one aspect, a method for producing an electric machine is specified, in particular the electric machine according to any embodiment described herein. The method includes providing at least one coil, which includes at least one insulated section and contacts. The method furthermore includes electrically connecting and arranging the contacts of the at least one coil such that the contacts of the at least one coil are electrically connected inside a housing, which is sealed off in relation to a flow path for the coolant fluid, to contacts of the power supply unit, and arranging the at least one insulated section in the flow path. Reference is made to the above specifications for the electric machine with respect to the advantages of the method.

The method may furthermore include calculating a thickness of an insulation layer, by which an electrical conductor of the coil is to be enclosed, in particular completely, at the insulated section. The at least one coil may be provided here with an insulation layer having the calculated thickness, in particular be produced and/or selected accordingly. This enables a tailor-made thickness which protects the coil and has a minimal weight at the same time.

The thickness of the insulation layer may be calculated based on a voltage provided by the power supply unit and/or with application of Paschen's law. This enables a particularly precisely set thickness.

To provide the at least one coil, the electrical conductor of the coil may be wrapped using a band made of insulating material, for example, in multiple layers. The conductor having the band wrapped around it may then be subjected to heat, for example, in a furnace, in order to form the insulation layer. Layers of the band located one on top of another and/or adjacent to one another are melted with one another in this case. Layers of the band located one on top of another and/or adjacent to one another may in particular be sintered here. It has been shown that this permits an attachment of the insulation layer, which is more robust than other methods, because it is multilayered. Alternatively, an insulating material may be applied to the conductor by extrusion, which forms, for example, a continuous layer. Manufacturing in such an endless process may be more cost-effective in particular in the case of high material demand. In certain examples, the material does not have so-called cold flow, as may be known in the case of extrudable fluoropolymers.

BRIEF DESCRIPTION OF THE DRAWINGS

Embodiments are now described by way of example with reference to the figures, in which, in schematic illustrations.

DETAILED DESCRIPTION

Figure 1:
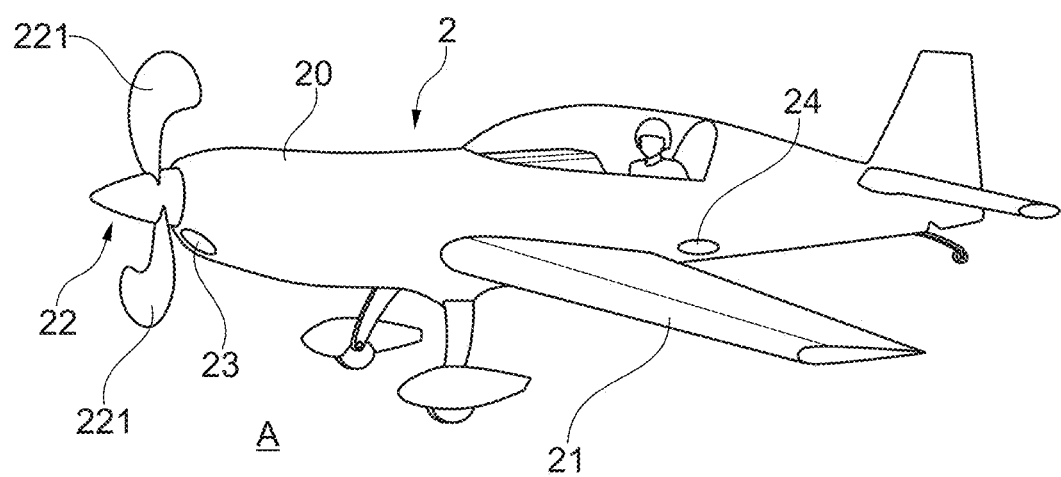
FIG. 1 depicts an example of an aircraft in the form of an airplane having an electrically driven rotor unit.

FIG. 1 shows an aircraft 2 in the form of an electrically powered airplane having a fuselage 20 and wings 21.

The aircraft 2 includes a drive system having a rotor unit 22, which is driven by an electric machine of the drive system. The rotor unit 22 includes a plurality of rotor blades 221, in this case two rotor blades 221 by way of example. The rotor blades 221 in the example shown are mounted on a hub, thus forming a propeller. In alternative embodiments, the aircraft 2 includes, for example, a fan instead of a propeller, and/or includes multiple drive systems each having at least one propeller, fan, or the like.

Furthermore, the aircraft 2 includes an air inlet 23 and (downstream thereof on the aircraft) an air outlet 24. The air inlet 23 and the air outlet 24 are each formed on an outer surface of the fuselage 20 but may also be provided at other points. Air may flow through the air inlet 23 from an external environment A of the aircraft 2 (and the electric machine) to the electric machine and from there to the air outlet 24. The air may then flow out back into the external environment A through the air outlet 24.

Figure 2:
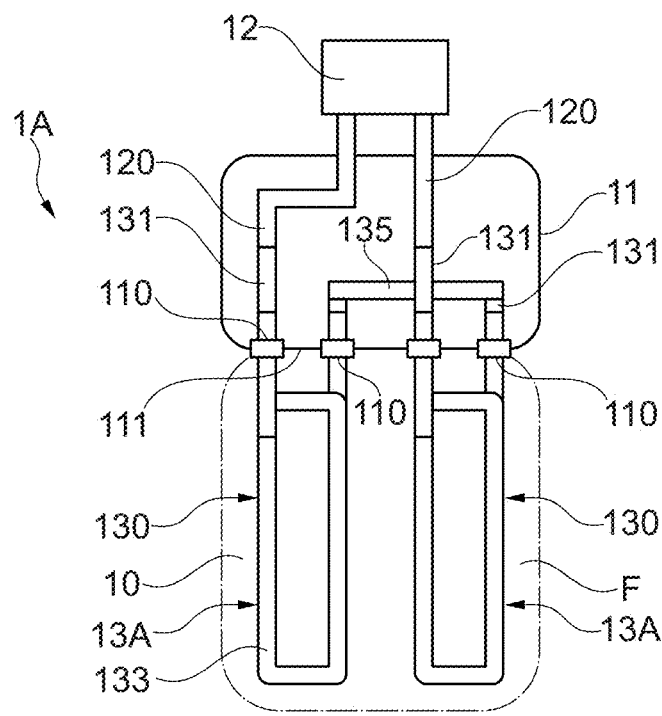
FIG. 2 depicts an example of components of an electric machine of the aircraft according to FIG. 1 in a simplified representation.

FIG. 2 shows parts of the electric machine 1A of the aircraft 2 in the form of a schematic illustration. The electric machine 1A includes a flow path 10 for coolant fluid F. The flow path 10 is bordered by a wall, which is illustrated here by an interrupted line. This wall is optional, but may contribute to guiding the coolant fluid F. The flow path 10 includes at least one inlet for the coolant fluid F and at least one outlet. In the present case, the air inlet 23 of the aircraft 2 is used as the inlet of the flow path, the at least one outlet is located downstream at a point of the aircraft 2 located further to the rear. The coolant fluid F is air from the external environment A in the present case. Alternatively, or additionally, water or another medium may be conducted as the coolant fluid through the flow path 10.

The electric machine 1A furthermore includes a housing 11 sealed off in an airtight and watertight manner in relation to the flow path 10. The housing 11 may, but does not have to, adjoin the flow path 10. The housing 11 includes an interior, which is closed off in an airtight and watertight manner from the flow path.

Furthermore, the electric machine 1A includes a power supply unit 12. The power supply unit 12 may be an inverter that provides a single-phase or multiphase, e.g., three-phase AC voltage. The power supply unit 12 is supplied with electric current, (e.g., direct current), by a battery of the aircraft 2, for example. The power supply unit 12 may be arranged outside the housing 11. Alternatively thereto, the power supply unit 12 is arranged inside the housing 11.

Furthermore, the electric machine 1A includes at least one coil 13A, two coils 13A here, which each include at least one insulated section 130 and electric contacts 131. The insulated section 130 is provided with an insulation layer 133.

The contacts 131 of the coils 13A are electrically connected inside the housing 11 to contacts 120 of the power supply unit 12. A conductor of the coils 13A may be uninsulated in the region of the contacts 120 of the coils 13A. The at least one insulated section 130 of the respective coil 13A is arranged in the flow path 10.

Coolant fluid F flowing through the flow path 10 may flow around and/or flow through the coils 13A here. The coolant fluid F may flow over several turns, e.g., each turn of a plurality of turns of each of the coils 13A and/or that the coolant fluid F may flow between sections and/or turns of the coils 13A. Particularly good cooling of the coils 13A is possible due to the direct contact of the coolant fluid F with the coils 13A. Differently than normal, the coils 13A, in particular individual turns, are thus not protected from direct application of coolant fluid in a housing or material enclosing them, for example potting, but rather are subjected directly to the coolant fluid F.

The contacts 131 of the coils 13A form the respective ends of the respective coil 13A. The contacts 131 of the coils 13A are arranged in the housing 11. For this purpose, the end sections of the coils 13A extend through a wall 111 of the housing 11 into the interior of the housing 11. The insulation layer 133 completely encloses the respective conductor of the coils 13A outside the housing 11 and extends into the housing 11. All surfaces of the conductor of the respective coil 13A not arranged in the interior of the housing 11 are covered and/or enclosed by the insulation layer 133 (or in another way). The ends of the respective coil 13A are guided here through seals 110 on the wall of the housing 11. The seals 110 each touch the respective coil 13A and the (or a) wall 111 of the housing 11. Alternatively, for example, the housing 11 itself and/or the insulation layer 133 may form the seals 110.

The seals 110 provide a sufficient watertight and airtight seal of the coils 13A in relation to the housing 11, so that, in the operation of the electric machine 1A, no coolant fluid F may reach the interior of the housing 11 from the flow path 10.

The contacts 131 are uninsulated in the interior of the housing 11. In the present case, two contacts 131 of the coils 13A are in electrical and physical contact with the contacts 120 of the power supply unit 12. Two further ones of the contacts 131 of the coils 13A are electrically connected to one another, in the example shown via a bridge 135. The coils 13A are thus connected in series in the present case, however, a parallel circuit of the coils 13A would also be conceivable, furthermore a radial or triangular circuit if a three-phase machine is used. Furthermore, the coils 13A may be formed by an integrally continuous conductor. It is to be noted that the arrangement having two coils 13A is solely by way of example and only one coil 13A may also be provided according to FIG. 2, as well as a greater number of coils 13A connected in parallel and/or in series.

The power supply unit 12 may provide a voltage of several hundred volts, (e.g., a voltage of at least 400 V or a voltage of at least 800 V), at the contacts 131 of the coils 13A. The voltage is an AC voltage. The values mentioned may be the effective value or the maximum value of the AC voltage.

In the completely produced state, the housing 11 may include an unfilled interior, but this is not necessarily the case. Alternatively, the interior of the housing 11 may be completely filled by the contacts 131, 120 and their supply lines and optionally further components. For example, the housing 11 is produced by potting the contacts 131, 120.

Figure 3:
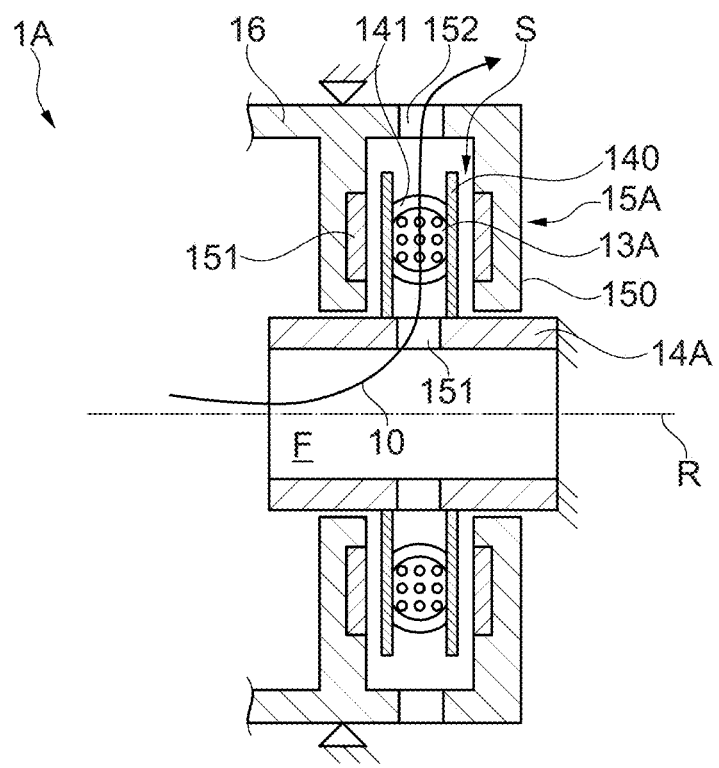
FIG. 3 depicts an example of an electric machine of the aircraft according to FIG. 1 in the form of a transverse flux machine in a cross-sectional view.

FIG. 3 shows the electric machine 1A of the aircraft 2 in a schematic sectional view. The electric machine 1A is in the form of an electric motor (which may be additionally or alternatively also usable as a generator). Specifically, the electric machine 1A is configured as a transverse flux machine. The electric machine 1A includes a stator 14A, on which the coils 13A are installed (only one of the coils 13A is shown in FIG. 3), a rotor 15A, and a shaft 16. The at least one coil 13A is thus configured as a stator coil. The shaft 16 transmits a torque in the operation of the electric machine 1A between the rotor 15A of the electric machine 1A and the rotor unit 22 of the aircraft 2. For example, the rotor unit 22 is fastened on the shaft 16 or operationally connected thereto in another way. The drive system optionally includes multiple electric machines 1A on the shaft 16.

The rotor 15A is mounted by bearings so as to be rotatable relative to the stator 14A around an axis of rotation R. The stator 14A is fixedly installed on a support of the aircraft 2. For example, the stator 14A is fixed relative to the fuselage 20. The stator 14A includes a base 140, on which the coil 13A is fixed. Specifically, the coil 13A is fastened here by a mount 141 on the base 140. The mount 141 encloses the coil 13A. The mount 141 holds the coil 13A so that the coolant fluid F may flow around it in the flow path 10. Potting of the coil 13A may be omitted due to the mount 141.

The rotor 15A includes a base 150, on which multiple (for example, surface-mounted) magnets 151 are installed in the form of permanent magnets. The magnets 151 are fastened around the axis of rotation R with alternating polarity in pairs on the base 150 of the rotor 15A. Permanently excited electric machines permit particularly high power densities and torque densities. The base 150 is fixed on the shaft 16. The magnets 151 face toward the coil 13A of the stator 14A.

In the present case, the base 150 of the rotor 15A includes two sections by way of example, which are designed in mirror image to one another and between which the stator 14A is arranged. Each of the two sections of the base 151 bears magnets 151 in the present case.

An electric current through the coil 13A generates a magnetic field, which sets the rotor 15A into a rotation around the axis of rotation R. A gap S, via which the magnetic forces act between the stator 14A and the rotor 15A, is formed here between the stator 14A and each of the sections of the rotor 15A having the magnets 151. Magnetic fields bridge the respective gap S here. In the present case, the magnetic field lines are guided via the mount 141. Each of the two gaps S may be filled with a gas or gas mixture, e.g., air. Each of the two gaps S has the shape of a circular disc at least in sections. The rotor 15A and the stator 14A are thus separated from one another on both sides of the stator 14A by a (flatly formed) air gap. The stator 14A and the rotor 15A are spaced apart from one another in an axial direction, parallel to the axis of rotation R. The magnets 151 of the rotor 11 are arranged axially adjacent to the stator 14A.

The flow path 10 extends in the present case through an interior of the stator 14A and radially outward through a passage 142 (in the base 140) of the stator 14A. Furthermore, the flow path 10 extends around (optionally through) the coil 13A and further radially outward through a passage 152 of the rotor 15A to an air outlet of the flow path 10. The coil 13A may have flow around it in multiple directions.

In the proposed solution, it is thus provided that external environmental influences, for example due to air, dirt, and water, are permitted up to the coil turns. During a (and due to a) flight of the aircraft 2, rainwater may be applied to the coil 13A. The insulation layer 133 has a thickness in the range of one or several hundred micrometers (for example at voltages less than 1 kV) and thus permits secure insulation with particularly good cooling properties at the same time. Because the coils 13A do not have to be arranged in a protective housing, the construction of the electric machine 1A may moreover be simplified. In particular, the housing of the stator of the machine may be partially or completely omitted if the electrical contacting is carried out in the housing of the voltage source.

Figure 4:
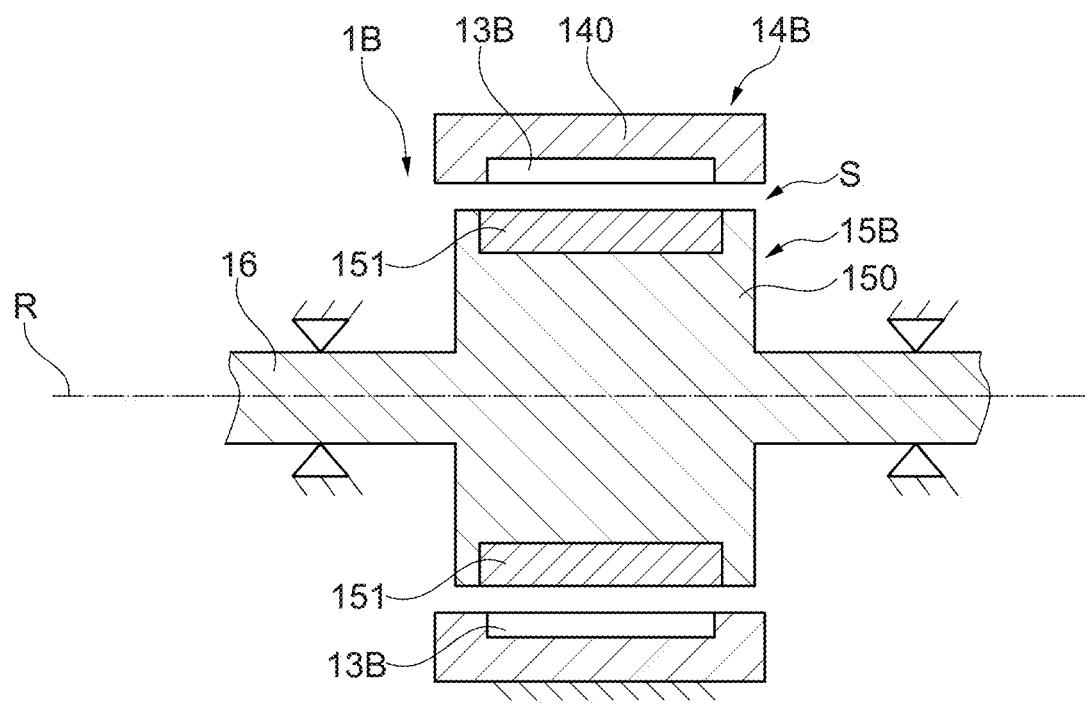
FIG. 4 depicts an example of an electric machine for the aircraft according to FIG. 1 in the form of a radial flux machine.

FIG. 4 shows an electric machine 1B, which the aircraft 2 may include alternatively or additionally to the electric machine 1A. The electric machine 1B is in the form of an electric motor (which is optionally also usable as a generator) and includes a stator 14B, a rotor 15B, and a shaft 16.

The rotor 15B is mounted by a bearing unit so it is rotatable around an axis of rotation R relative to the stator 14B. The electric machine 1B is designed in the present case as an internal rotor, wherein a design as an external rotor would also be conceivable. In the present case, the stator 14B encloses the rotor 15B. The rotor 15B is accommodated at least in sections in the stator 14B. The stator 14B is fixedly installable on a support of the aircraft 2. For example, the stator 14B is fixable or fixed relative to the fuselage 20.

The stator 14B includes a base, on which multiple coils 13B are fixed. The coils 13B are insulated according to FIG. 2 and are connected in a housing (not shown in FIG. 4). The rotor 15B includes a base 150, on which multiple magnets 151 in the form of permanent magnets are fixed.

An electrical current through the coils 102 generates a magnetic field which sets the rotor 15B into a rotation around the axis of rotation R. A gap S, via which the magnetic forces act between the stator 14B and the rotor 15B, is formed here between the stator 14B and the rotor 15B. The gap S is filled with a gas or gas mixture, here with air. The gap S has a circular-cylindrical shape. In this way, the rotor 15B and the stator 14B are mutually separated by an air gap of hollow-cylindrical shape.

Figure 5:
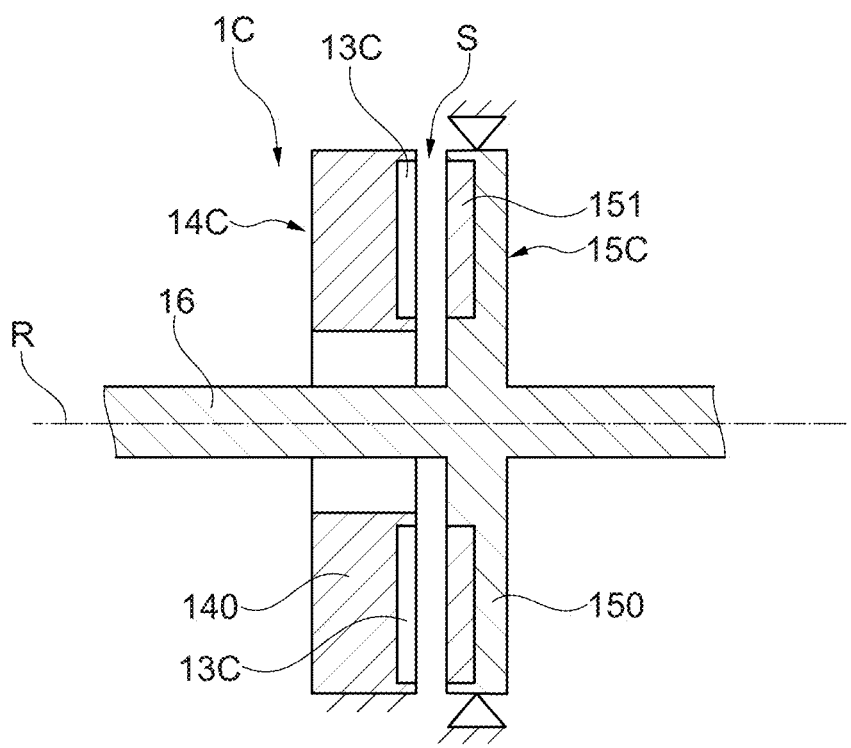
FIG. 5 depicts an example of an electric machine for the aircraft according to FIG. 1 in the form of an axial flux machine.

FIG. 5 shows an electric machine 1C for the aircraft 2, which the aircraft 2 may include instead of the electric machine 1A according to FIGS. 2 and 3 and/or the electric machine 1B according to FIG. 4, or additionally thereto.

The electric machine 1C includes a stator 14C, a rotor 15C rotatable relative to the stator 14C, wherein a gap S is formed between the stator 14C and the rotor 15C, via which magnetic forces act between the stator 14C and the rotor 15C. The electric machine 1C is an axial force machine and the magnetic fields bridge the gap S in the axial direction. The gap S has the shape of a circular disc.

Figure 6A:
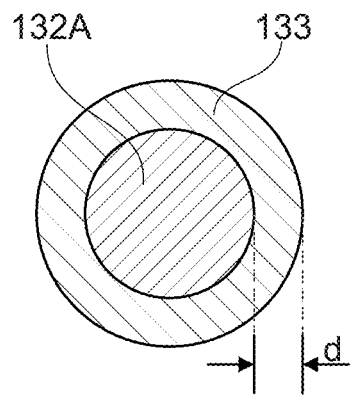
FIGS. 6A-6C depicts examples of cross-sectional views of possible designs of electrical conductors including insulation layer of the electric machines according to FIGS. 2 to 5.

FIG. 6A shows the conductor 132A of one of the coils 13A of the electric machine 1A according to FIGS. 2 and 3 in section. The coils 13B, 13C of the electric machines 1B, 1C according to FIGS. 4 and 5 may also be formed by the conductor 132A. The conductor 132A has a circular cross section. The conductor 132A may be a solid wire or a lead conductor. The conductor 132A is enclosed by the insulation layer 133. The insulation layer 133 has a thickness d of 180 µm in accordance with the voltage of 800 V provided by the power supply unit 12. Depending on the level of the voltage provided by the power supply unit 12, the thickness may be at least 50 µm, at least 90 µm, at least 140 µm, at least 180 µm, at least 200 µm, at least 300 µm, or exactly 300 µm. The thickness d of the insulation layer 133 is dimensioned so that it provides a sufficient electrical insulation for the maximum voltage applied at the contacts 131 of the coil 13A. In comparison to conventional coils, where the maximum voltage difference is only insulated between two adjacent coil turns, this results in a greater thickness of the insulation layer 133 (for example, of 200 micrometers at 1 kV), because the insulation is provided at each point in relation to the directly applied coolant medium. However, the flow path 10 may thus also be filled with water without damage, in particular water having conductive properties. A further advantage is that, in the coil 13A, a distinction is not made for the insulation between turn to ground and turn to turn, which also simplifies the structure. The insulation layer 133 may have at least a thickness that provides an insulation at the voltage provided by the power supply unit 12, and, in particular, is breakdown-proof.

The insulation layer 133 includes a fluorinated material. The material of the insulation layer 133 may be FEP, PTFE, ETFE, or PFA. Alternatively, or additionally, the material of the insulation layer 133 includes a silicone material. Silicone materials are particularly flexible and do not have a cold flow. PTFE has particularly low water absorption. It may be provided that the material of the insulation layer has a water absorption of less than 1%.

Figure 6B:
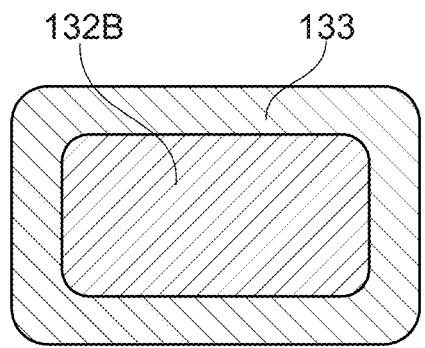

FIG. 6B shows an insulated conductor 132B for the electric machines 1A-1C according to FIGS. 2-5. The conductor according to FIG. 6B may be used in particular for the electric machines 1B, 1C according to FIGS. 4 and 5. The conductor 132B is constructed like the conductor 132A according to FIG. 6A, but in contrast thereto has a rectangular cross section.

Figure 6C:
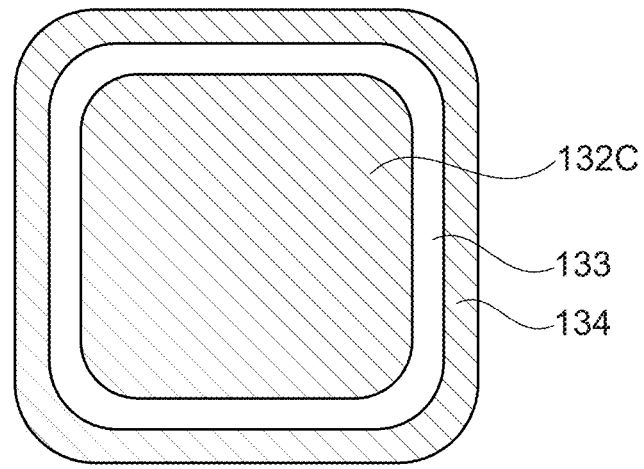

FIG. 6C shows a further insulated conductor 132C for the electric machines 1A-1C according to FIGS. 2-5. The conductor 132C is fundamentally constructed like the conductors 132A, 132B according to FIGS. 6A and 6B, but in contrast thereto has a square cross section. However, this shape is by way of example and the conductor 132C according to FIG. 6C may also become or be produced with a round, rectangular, or differently shaped cross section. In contrast to the conductors 132A, 132B according to FIGS. 6A and 6B, an outer metal coating 134 is additionally provided in the conductor 132C according to FIG. 6C. The outer metal coating 134 encloses the insulation layer 133. The metal coating 134 may be applied by plastic metallization, for example, by electroplating. This may be carried out, for example, in the following acts.

The surface of the insulation layer 133 is optionally roughened by pickling using an oxidative metal salt solution. Furthermore, the surface may optionally be activated using metal seeds, for example, palladium. A chemical metallization is carried out to form an electrically conductive layer. For this purpose, a (thin) layer (for example, 0.3 to 0.4 µm thin layer), for example, made of copper or nickel, is created by reduction from the metal salts thereof. The deposition of the actual metal layer thereupon takes place in one or more electroplating baths. The electroplating allows a continuous conductive coating of the surface. The application of the metal coating 134 may take place before or after the winding of the coil 13A-13C. A coating having nanoparticles is optionally applied.

Figure 7:
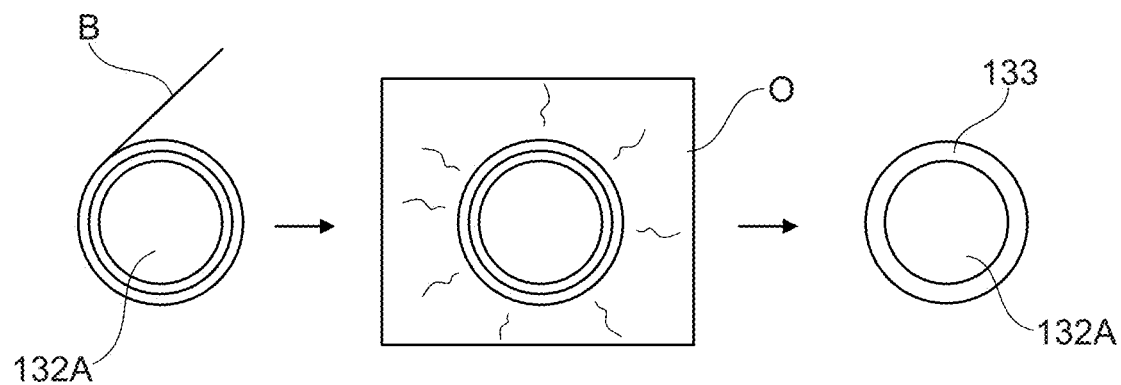
FIG. 7 depicts an example of method acts for providing an electrical conductor for the electric machines according to FIGS. 2 to 5 with an insulation layer.

FIG. 7 furthermore illustrates an optional method for producing the insulation layer 133 of the coils 13A-13C. In the present case, the insulation layer 133 of the respective coils 13A-13C according to FIGS. 2 to 5 is produced in this way. In this case, initially the conductor 132A is wrapped using a band B made of the material of the insulation layer 133. The band B may be wound in multiple layers here. The band B is wound so that all surface regions of the conductor 132A which are arranged later in the flow path 10 are covered using the band B.

Heat is thereupon applied to the conductor 132A wrapped using the band B, in the present case in a furnace O. In this case, the material of the band is sintered and forms the insulation layer 133. If this has not already taken place, the insulated conductor 132A may thereupon be bent to form the coil 13A.

This winding method does not have the disadvantage of other methods, for example, a more cost-effective extrusion, of the so-called cold flow, which may result in irreversible deformations of the insulation layer and may therefore shorten the lifetime of the corresponding coil, if a mechanical pressure (sometimes very small) is exerted on the insulation layer over a longer time.

Figure 8:
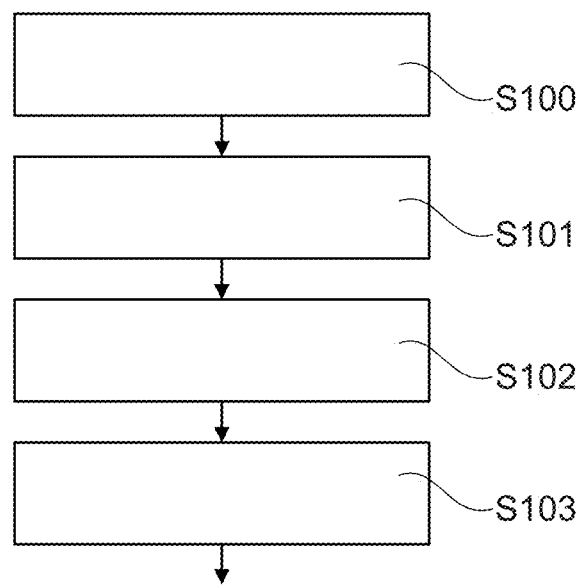
FIG. 8 depicts an example of a method for producing an electric machine.

FIG. 8 shows a method for producing an electric machine 1A-1C, in particular one of the electric machines 1A-1C according to FIGS. 2-5. The method includes the following acts.

Act S100: Calculating a thickness d of an insulation layer 133, by which an electrical conductor 132A-132C of a coil 13A-13C is to be completely enclosed to form at least one insulated section 130. The thickness d of the insulation layer 133 may be calculated based on a voltage provided by the power supply unit 12 and/or with application of Paschen's law.

Specifically, in this case a voltage may first be specified, for example, 800 V. A dimensioning voltage may be defined, which includes optional safety factors, for example, 1000 V. A density correction, an air density correction in the case of air as a coolant fluid, may be performed, which results, for example, in 1250 V. A minimal thickness may then be ascertained, for example, by a simulation and/or by calculation of Paschen's law. The value thus obtained (or a differently ascertained value for a minimal thickness of the insulation layer), for example, 90 micrometers, may be multiplied by the relative permittivity of the insulation material (for example, 2), from which 180 micrometers follow, for example. In this example, the insulation thickness from turn to turn is then 360 micrometers throughout, whereas designs according to routine construction, which distinguish between turn-to-turn insulation and turn to ground insulation, e.g., already manage with a tenth of the voltage and therefore insulation thickness.

Act S101: Providing at least one coil 13A-13C, which includes the at least one insulated section 130 and contacts 131. The at least one coil 13A-13C is provided here with an insulation layer 133 having the calculated thickness d.

Act S102: Electrically connecting and arranging the contacts 131 of the at least one coil 13A-13C such that the contacts 131 of the at least one coil 13A-13C are electrically connected inside a housing 11, which is sealed off in relation to a flow path 10 for coolant fluid F, to contacts 120 of the power supply unit 12. The housing 11 may be prefinished or may be produced, for example, by potting (for example, by a dielectric material) at the contacts 131, 120.

Act S103 (which may be carried out before, after, or simultaneously with act S102): Arranging the at least one insulated section 130 in the flow path 10. Optionally, parts of the at least one insulated section 130 are fixed by a mount, wherein the mount may also be produced by potting.

Direct water cooling may also be provided by the insulation layer 133. Water is then conducted through the flow path 10 instead of air as the coolant fluid F.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

LIST OF REFERENCE SIGNS

1A-1C electric machine
10 flow path
11 housing
110 seal
111 wall
12 power supply unit
120 contact
13A-13C coil
130 insulated section
131 contact
132A-132C conductor
133 insulation layer
134 metal coating
135 bridge
14A-14C stator
140 base
141 mount
142 passage
15A-15C rotor
150 base
151 magnet
152 passage
16 shaft
2 aircraft
20 fuselage
21 wing
22 rotor unit
221 rotor blade
23 air inlet
24 air outlet
A external environment
B band
d thickness
F coolant fluid
O furnace
R axis of rotation
S gap

The invention claimed is:

1. An electrical machine comprising:
   a flow path for a coolant fluid;
   a housing comprising an interior that is sealed off in an airtight and watertight manner from the flow path, wherein the flow path is positioned outside of the housing;
   a power supply unit; and
   at least one coil that comprises at least one insulated section and contacts,
   wherein the at least one coil comprises end sections that extend through a wall of the housing into the interior of the housing,
   wherein the contacts of the at least one coil are positioned at the end sections and are electrically connected in the interior of the housing to contacts of the power supply unit, and
   wherein the at least one insulated section of the at least one coil is arranged in the flow path outside of the housing.

2. The electric machine of claim 1, wherein the at least one coil is a stator coil and is fastened on a base of a stator of the electric machine.

3. The electric machine of claim 2, wherein the at least one coil is fastened by a mount that holds the at least one coil in the flow path, and
   wherein the mount is on the base of the stator.

4. The electric machine of claim 2, further comprising:
   a rotor mounted so as to be rotatable in relation to the stator.

5. The electric machine of claim 1, wherein the electric machine is a transverse flux machine.

6. The electric machine of claim 1, wherein the flow path has a fluid connection to an external environment, and
   wherein the coolant fluid is air from the external environment.

7. The electric machine of claim 6, wherein the flow path begins at the external environment and ends at the external environment.

8. The electric machine of claim 1, wherein the flow path extends through turns of the at least one coil.

9. The electric machine of claim 1, wherein an electrical conductor of the coil is completely enclosed by an insulation layer at the insulated section.

10. The electric machine of claim 9, wherein the insulation layer on the insulated section has a minimal thickness of 50 micrometers ($\mu m$).

11. The electric machine of claim 9, wherein the insulation layer comprises a fluorinated material or a silicon material.

12. The electric machine of claim 9, wherein an electrically conductive outer layer is positioned on an outer surface of the insulation layer.

13. The electric machine of claim 12, wherein the electrically conductive outer layer comprises a metal coating.

14. The electric machine of claim 1, wherein the power supply unit is configured to provide a voltage of at least 400 V at the contacts of the at least one coil.

15. The electric machine of claim 1, wherein the at least one coil is led by a seal through the wall of the housing.

16. An aircraft comprising:
    a rotor unit comprising rotor blades; and
    an electric machine configured to drive the rotor unit,
    wherein the electric machine comprises:
       a flow path for a coolant fluid;
       a housing comprising an interior that is sealed off in an airtight and watertight manner from the flow path, wherein the flow path is positioned outside of the housing;
       a power supply unit; and
       at least one coil that comprises at least one insulated section and contacts,
       wherein the at least one coil comprises end sections that extend through a wall of the housing into the interior of the housing,
       wherein the contacts of the at least one coil are positioned at the end sections and are electrically connected in the interior of the housing to contacts of the power supply unit, and
       wherein the at least one insulated section of the at least one coil is arranged in the flow path outside of the housing.

17. A method for producing an electric machine, the method comprising:
    providing at least one coil that includes at least one insulated section and contacts wherein the at least one coil comprises end sections that extend through a wall of a housing into an interior of the housing; and
    electrically connecting and arranging the contacts of the at least one coil such that the contacts of the at least one coil are positioned at the end sections and are electrically connected in the interior of the housing to contacts of a power supply unit, wherein the interior of the housing is sealed off in an airtight and watertight manner from a flow path for a coolant fluid, and wherein the flow path is positioned outside of the housing; and
    arranging the at least one insulated section in the flow path outside of the housing.

18. The method of claim 17, further comprising:
    calculating a thickness of an insulation layer, by which an electrical conductor of the coil is to be completely enclosed on the insulated section,
    wherein the at least one coil is provided with the insulation layer having the calculated thickness.

19. The method of claim 18, wherein the thickness of the insulation layer is calculated based on a voltage provided by the power supply unit and with application of Paschen's law.

20. The method of claim 18, wherein, to provide the at least one coil, the electrical conductor of the coil is wrapped using a band made of an insulation material, to which heat is then applied in order to form the insulation layer.

* * * * *